US008856764B2

(12) United States Patent
Pistoia et al.

(10) Patent No.: US 8,856,764 B2
(45) Date of Patent: Oct. 7, 2014

(54) DISTRIBUTED STATIC ANALYSIS OF COMPUTER SOFTWARE APPLICATIONS

(75) Inventors: Marco Pistoia, Amawalk, NY (US); Omer Tripp, Har-Adar (IL); Omri Weisman, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 621 days.

(21) Appl. No.: 13/012,804

(22) Filed: Jan. 25, 2011

(65) Prior Publication Data
US 2012/0192161 A1 Jul. 26, 2012

(51) Int. Cl.
*G06F 9/45* (2006.01)
*G06F 9/44* (2006.01)
*G06F 11/36* (2006.01)

(52) U.S. Cl.
CPC .............. *G06F 8/75* (2013.01); *G06F 11/3604* (2013.01)
USPC .......................................... 717/154; 717/152

(58) Field of Classification Search
None
See application file for complete search history.

(56) References Cited

U.S. PATENT DOCUMENTS

| | | | |
|---|---|---|---|
| 6,266,666 B1 * | 7/2001 | Ireland et al. .................. | 707/770 |
| 6,282,701 B1 | 8/2001 | Wygodny et al. | |
| 6,542,920 B1 * | 4/2003 | Belkin et al. .................. | 718/104 |
| 6,721,941 B1 | 4/2004 | Morshed et al. | |
| 6,745,384 B1 * | 6/2004 | Biggerstaff .................... | 717/155 |
| 6,823,507 B1 * | 11/2004 | Srinivasan et al. ............. | 717/152 |
| 6,904,335 B2 * | 6/2005 | Solomon ........................ | 700/247 |
| 7,177,854 B2 * | 2/2007 | Chun et al. ..................... | 707/600 |
| 7,293,259 B1 * | 11/2007 | Dmitriev ........................ | 717/154 |
| 7,293,260 B1 * | 11/2007 | Dmitriev ........................ | 717/154 |
| 7,590,978 B2 * | 9/2009 | Chang et al. ................... | 717/155 |
| 7,627,861 B2 * | 12/2009 | Smith et al. .................... | 717/144 |
| 7,779,399 B2 * | 8/2010 | Huang et al. ................... | 717/154 |
| 8,006,233 B2 * | 8/2011 | Centonze et al. .............. | 717/154 |
| 8,141,049 B2 * | 3/2012 | Kahlon .......................... | 717/126 |
| 8,176,085 B2 * | 5/2012 | Della-Libera et al. ......... | 707/797 |
| 8,245,211 B2 * | 8/2012 | Gellerich ....................... | 717/155 |
| 8,250,553 B2 * | 8/2012 | Gellerich ....................... | 717/155 |
| 8,266,604 B2 * | 9/2012 | Groff et al. .................... | 717/146 |
| 8,484,630 B2 * | 7/2013 | Cui et al. ........................ | 717/155 |
| 8,527,976 B2 * | 9/2013 | Kahlon et al. ................. | 717/152 |
| 8,555,269 B2 * | 10/2013 | Huang et al. ................... | 717/154 |
| 8,661,450 B2 * | 2/2014 | Luo et al. ....................... | 717/152 |

(Continued)

OTHER PUBLICATIONS

Durfee, "Distributed Problem Solving and Planning", 1999 MIT press as a chapter of the book "Multiagent Systems—A modern Approach to Distributed Artificial Intelligence"; [retrieved on Jun. 25, 2013]; Retrieved from Internet <URL:http://www.sci.brooklyn.cuny.edu/~parsons/courses/716-spring-2010/papers/durfee-dps.pdf>;pp. 1-45.*

(Continued)

*Primary Examiner* — Xi D Chen
(74) *Attorney, Agent, or Firm* — North Shore Patents, P.C.; Michele Liu Baillie; Lesley Leonessa

(57) ABSTRACT

A method for distributed static analysis of computer software applications, includes: statically analyzing instructions of a computer software application; identifying at least one entry point in the computer software application; assigning a primary agent to statically analyze the computer software application from the entry point; assigning a secondary agent to statically analyze a call site encountered by the primary agent and produce a static analysis summary of the call site; and presenting results of any of the static analyses via a computer-controlled output device.

17 Claims, 4 Drawing Sheets

(56) References Cited

U.S. PATENT DOCUMENTS

| | | | |
|---|---|---|---|
| 8,726,254 B2* | 5/2014 | Rohde et al. | 717/154 |
| 2006/0212759 A1 | 9/2006 | Campbell et al. | |
| 2007/0016464 A1* | 1/2007 | Yen et al. | 705/9 |
| 2007/0083933 A1 | 4/2007 | Venkatapathy et al. | |
| 2007/0288899 A1* | 12/2007 | Fanning et al. | 717/152 |
| 2008/0098207 A1* | 4/2008 | Reid et al. | 712/227 |
| 2008/0189696 A1 | 8/2008 | De Sutter et al. | |
| 2009/0119549 A1* | 5/2009 | Vertes | 714/47 |
| 2009/0288075 A1* | 11/2009 | Song et al. | 717/160 |

OTHER PUBLICATIONS

Whiteson, Stone, "Concurrent Layered Learning", 2003 ACM; [retrieved on Jun. 25, 2013]; Retrieved from Internet <URL:http://dl.acm.org/citation.cfm?id=860607>;pp. 193-200.*

Panait, Luke, "Cooperative Multi-Agent Learning: The State of the Art"; 2005 Springer; [retrieved on Jun. 25, 2013]; Retrieved from Internet <URL:http://jmvidal.cse.sc.edu/library/panait05a.pdf>;pp. 387-343.*

Adzhiev, et al., "An Agent-oriented Framework for Concurrent Engineering", 1994 IEEE; [retrieved on Jun. 23, 2013]; Retrieved from Internet <URL:http://www2.warwick.ac.uk/fac/sci/dcs/research/em/publications/papers/downloads/040.pdf>;pp. 1-4.*

Fischer, et al., "Holonic Multiagent Sysems: A Foundation for the Organisation of Multiagent Systems"; 2003 Springer; [retrieved on Nov. 28, 2013]; Retrieved from Internet <URL: http://link.springer.com/chapter/10.1007/978-3-540-45185-3_7>;pp. 71-80.*

Patent Trial and Appeal Board, Ex Parte Mewherter; 2012; [retrieved on Nov. 28, 2011]; Retrieved from internal emails circulated within the patent corp of USPTO;pp. 1-20.*

Calabrese, "Hierarchical-Granularity Holonic Modelling"; 2009, University of Milano; [retrieved on Nov. 28, 2013]; Retrieved from Inernet <URL:http://air.unimi.it/bitstream/2434/155499/2/phd_unimi_R07647.pdf>;pp. 1-120.*

Rodriguez, "A Concurrent IFDS Dataflow Analysis Algorithm Using Actors"; 2010, University of Waterloo; [retrieved on May 26, 2014]; Retrieved from Internet <URL:http://plg.uwaterloo.ca/~olhotak/pubs/thesis-j2rodrig-mmath.pdf>;pp. 1-79.*

Knies, Adams III, "The Integrated Library Approach to Parallel Computing"; 1994 IEEE; [retrieved on May 26, 2014]; Retrieved from Internet <URL:http://ieeexplore.ieee.org/stamp/stamp.jsp?tp=&arnumber=365558>;pp. 253-260.*

Girko, Lastovetsky, "Using Static Code Analysis to Improve Performance of GridRPC Applications", 2012 IEEE; [retrieved on May 26, 2014]; Retrieved from Internet <URL:http://ieeexplore.ieee.org/stamp/stamp.jsp?tp=&arnumber=6270761>;pp. 1113-1119.*

Thies, Bodden, "RefaFlex: Safer Refactorings for Reflective Java Programs"; 2012, ACM; [retrieved on May 26, 2014]; Retrieved from Internet <URL:http:dl.acm.org/citation.cfm?id=2338965>;pp. 1-11.*

Rellermdyer, et al., "R-OSGi: Distributed Applications Through Software Modularization"; 2007, IFIP International Federation for Information Processing; [retrieved on May 26, 2014]; Retrieved from Internet <URL:http://dl.acm.org/citation.cfm?id=1516124>;pp. 1-20.*

Tristan Ravitch et al., "Automatic Generation of Library Bindings Using Static Analysis", Jun. 15-20, 2009, Dublin, Ireland. URL:http://pages.cs.wisc.edu/~liblit/pldi-2009-b/.

David Wagner and Drew Dean, "Intrusion Detection via Static Analysis"URL:http://www.eecs.berkeley.edu/~daw/papers/ids-oakland01.pdf.

Hany F. EL Yamany et al., "A Multi-Agent Framework for Testing Distributed Systems", IEEE 2006. URL:http://www.computer.org/portal/web/csdl/doi/10.1109/COMPSAC.2006.98.

Dr. Paul Anderson, "The Use and Limitations of Static-Analysis Tools to Improve Software Quality", STSC, Jun. 2008. URL:http://www.stsc.hill.af.mil/crossTalk/2008/06/0806Anderson.html.

Sherif A. Elfayoumy and James H. Graham, "An Agent-Based Architecture for Tuning Parallel and Distributed Applications Performance" URL:http:/users.crhc.illinois.edu/steve/wcbc00/wcbc-00-elg.pdf.

Arnaud Venet, "A Practical Approach to Formal Software Verification by Static Analysis", Ada Letters, Apr. 2008. URL:http://portal.acm.org/citation.cfm?id=1387836&dl=GUIDE&coll=GUIDE&CFID=73921262&CFTOKEN=19425395.

David Wagner and Drew Dean, "Intrusion Detection via Static Analysis"URL:http://www.eecs.berkeley.edu/~daw/papers/ids-oakland01.pdf; 2001.

Sherif A. Elfayoumy and James H. Graham, "An Agent-Based Architecture for Tuning Parallel and Distributed Applications Performance", 2nd International Workshop on Cluster-Based Computing (WCBC'2000), the 2000 International Conference on Supercomputing, Santa Fe, New Mexico, May 2000.

Wagner, D. et. al.; "Intrusion Detection via Static Analysis"; Proceedings of the 2001 IEEE Symposium on Security and Privacy; pp. 156-169; May 2001.

Yamany, H. et al.; "A Multi-Agent Framework for Testing Distributed Systems", Proceedings of 30th IEEE Annual International Computer Software and Applications Conference; pp. 151-156; Sep. 2006.

* cited by examiner

```
static void main(String[] args) {
        String fileName = args[0];
        String tempFilePath = tempDirPrefix(fileName);
        File f = new File(tempFilePath);
        f.close();
} static String tempDirPrefix(String arg) {
        return "c:/temp/" + arg;
}
```

Fig. 3

DISTRIBUTED STATIC ANALYSIS OF COMPUTER SOFTWARE APPLICATIONS

FIELD OF THE INVENTION

The present invention relates to computer software analysis and testing in general.

BACKGROUND

Designers of tools that perform static analysis on computer software applications are often faced with finding the right balance between precision and performance/scalability. The more accurate the analysis results are expected to be, the more information the analysis needs to maintain and reason about, which leads to degradation in performance/scalability. Some tools attempt to address this issue by statically analyzing software libraries on which software applications typically depend, and producing summaries of the behavior of the software libraries. Thereafter, when a target software application is statically analyzed, the software libraries need not be analyzed, as their summaries are used instead. This enables the static analysis of a target software application to scan less code without compromising precision, provided the libraries were statically analyzed using a precise analysis. However, this approach does have its costs, as the summaries must be maintained in storage, preferably of a type that provides efficient access when the target software application is statically analyzed. Furthermore, as such summaries are currently prepared without advance knowledge of the specific characteristics of the various target software applications that are to be statically analyzed, or of the analyses themselves, the summaries need to be exhaustive in order to adequately anticipate different sets of such characteristics, typically resulting in a cumbersome summary generation process that generates huge summaries. Another problem is that such summaries are often overly conservative, as they need to account for all possible client behaviors.

SUMMARY OF THE INVENTION

In one aspect of the present invention, a method is provided for distributed static analysis of computer software applications, the method including: statically analyzing instructions of a computer software application; identifying at least one entry point in the computer software application; assigning a primary agent to statically analyze the computer software application from the entry point; assigning a secondary agent to statically analyze a call site encountered by the primary agent and produce a static analysis summary of the call site; and presenting results of any of the static analyses via a computer-controlled output device.

A system and computer program product embodying the present invention are also provided.

BRIEF DESCRIPTION OF THE SEVERAL VIEWS OF THE DRAWINGS

The present invention will be understood and appreciated more fully from the following detailed description taken in conjunction with the appended drawings in which:

FIG. 3 is an example of computer software application instructions in accordance with an embodiment of the present invention.

DETAILED DESCRIPTION

Figure 1:
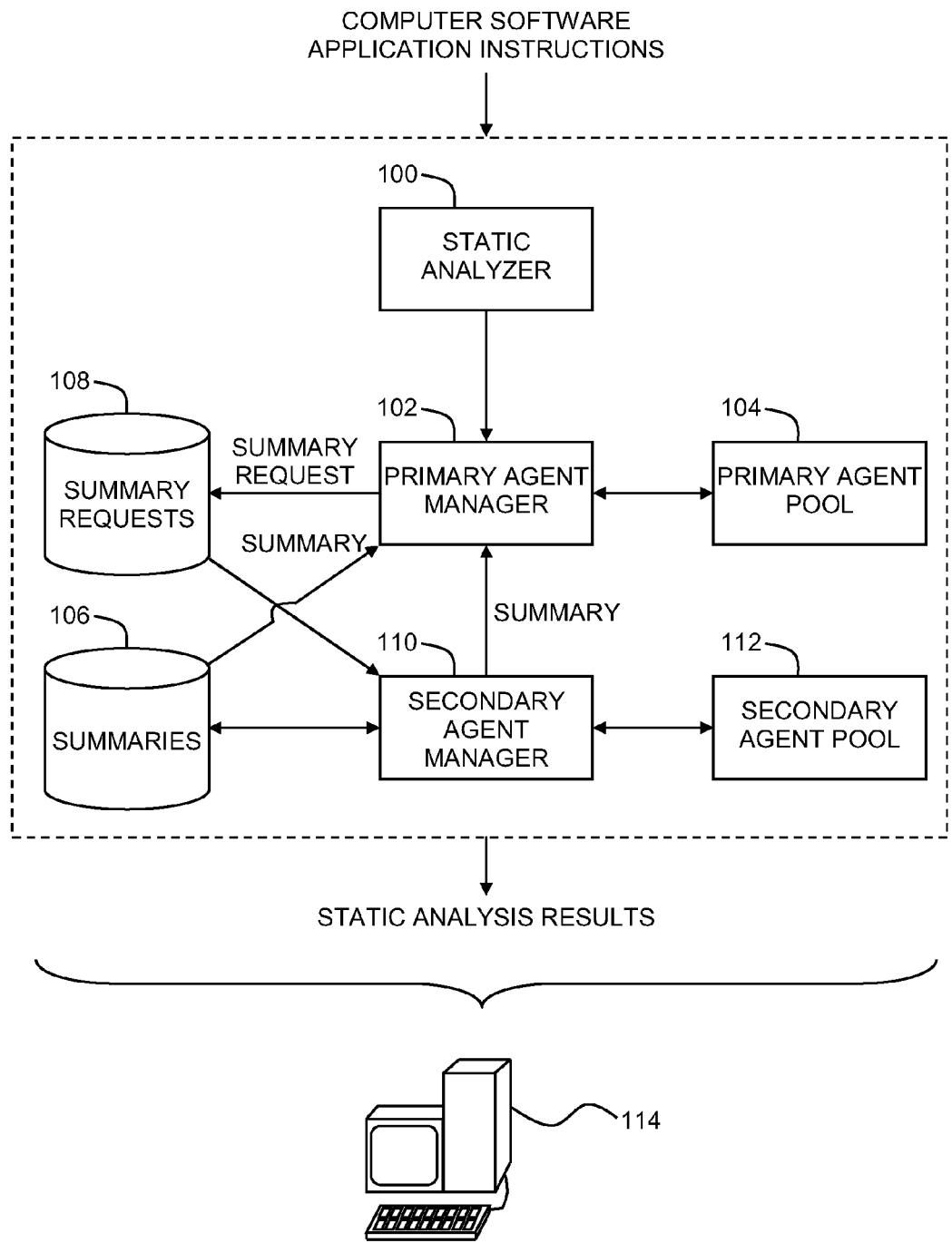
FIG. 1 is a conceptual illustration of a system for distributed static analysis of computer software applications in accordance with an embodiment of the present invention.

The present invention is now described within the context of one or more embodiments, although the description is intended to be illustrative of the present invention as a whole, and is not to be construed as limiting the present invention to the embodiments shown. It is appreciated that various modifications may occur to those skilled in the art that, while not specifically shown herein, are nevertheless within the true spirit and scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a conceptual illustration of a system for distributed static analysis of computer software applications in accordance with an embodiment of the present invention. In the system of FIG. 1, a static analyzer 100 is configured to statically analyze the instructions of a computer software application in accordance with conventional techniques, such as where the instructions are in the form of source code or byte code. For each entry point in the computer software application identified by static analyzer 100, a primary agent manager 102 assigns a primary agent to begin statically analyzing the computer software application from the entry point and with respect thereto. An entry point is preferably an interaction interface exposed by the computer software application to sources of interaction that are external to the computer software application. Primary agent manager 102 may assign multiple primary agents to statically analyze the computer software application concurrently, with each primary agent statically analyzing the computer software application from a different entry point. Each primary agent is a computer process that is preferably executed by a single computer processor or single core of a multi-core computer processor, preferably where no two primary agents are executed by the same computer processor or core when multiple primary agents are operating concurrently. To this end, a pool 104 of primary agents may be maintained, where each primary agent waits to be assigned by primary agent manager 102 to an entry point, and where each primary agent is returned to pool 104 once it completes its static analysis of its assigned entry point.

When a primary agent encounters a call site, such as a reference to a method, procedure, or function that is external to the current method/procedure/function being analyzed, the primary agent checks whether a static analysis summary of the external method/procedure/function exists. If a summary does exist, such as where the summary was previously requested, generated, and retained in a data store of summaries 106, the requested summary is provided to the primary agent, whereupon the requesting primary agent proceeds with its analysis using the summary.

If a static analysis summary of the external method/procedure/function does not exist, the primary agent preferably suspends its analysis and issues a request for a static analysis summary of the external method/procedure/function, such as by placing the request on a designated queue of requests for static analysis summaries, such as a queue of summary requests 108. A secondary agent manager 110 assigns a secondary agent to statically analyze the called external method/procedure/function and produce an analysis summary thereof in accordance with conventional techniques. Secondary agent manager 110 may assign multiple secondary agents to statically analyze the computer software application concurrently, with each secondary agent statically analyzing a different call site Like primary agents, each secondary agent is preferably a computer process that is executed by a single computer processor or single core of a multi-core computer processor, preferably where no two secondary agents are executed by the same computer processor or core when multiple secondary agents are operating concurrently. Preferably, no two primary and/or secondary agents are executed by the same computer processor or core when multiple primary and/or secondary agents are operating concurrently, and preferably the number of primary and secondary agents is equal to the number of cores on the machine(s) available for the analysis. Secondary agents may also be maintained in a pool 112 of secondary agents. While the requesting primary agent suspends its analysis, the secondary agent may be executed by the requesting primary agent's processor or core. Once the secondary agent has produced the requested summary, the summary is preferably retained in the data store of summaries 106, and the requested summary is provided to the requesting primary agent, whereupon the requesting primary agent proceeds with its analysis using the summary.

When checking for an existing summary or making the request for a summary, the primary agent preferably specifies an abstraction of concrete values for each argument required by the call site, where an abstraction is computed based on the characteristics of the call site and the state of the computer software application when the call site is reached, where the state is determined as part of the static analysis performed by the primary agent. For example, if the call is to a method 'foo( )' that takes an argument of type 'int', and the static analysis abstraction of 'int' is 'odd' or 'even', then the request may be for a summary of the behavior of 'foo( )' given an 'odd' integer if the current state indicates that the argument will most likely be odd. If a summary exists that was previously produced with respect to at least the specified abstractions, the primary agent preferably uses the summary. Where such a summary does not exist, and is therefore produced by a secondary agent, the secondary agent preferably produces the static analysis summary only with respect to the abstractions specified by the primary agent.

Any of the elements shown in FIG. 1 are preferably executed by or otherwise made accessible to a computer 114 such as by implementing any of the elements in computer hardware and/or in computer software embodied in a physically-tangible, non-transitory, computer-readable medium in accordance with conventional techniques. The results of the static analysis performed by the system of FIG. 1 may be presented by static analyzer 100 to a user in accordance with conventional techniques via a computer-controlled output device such as a printer or computer monitor of computer 114.

Figure 2:
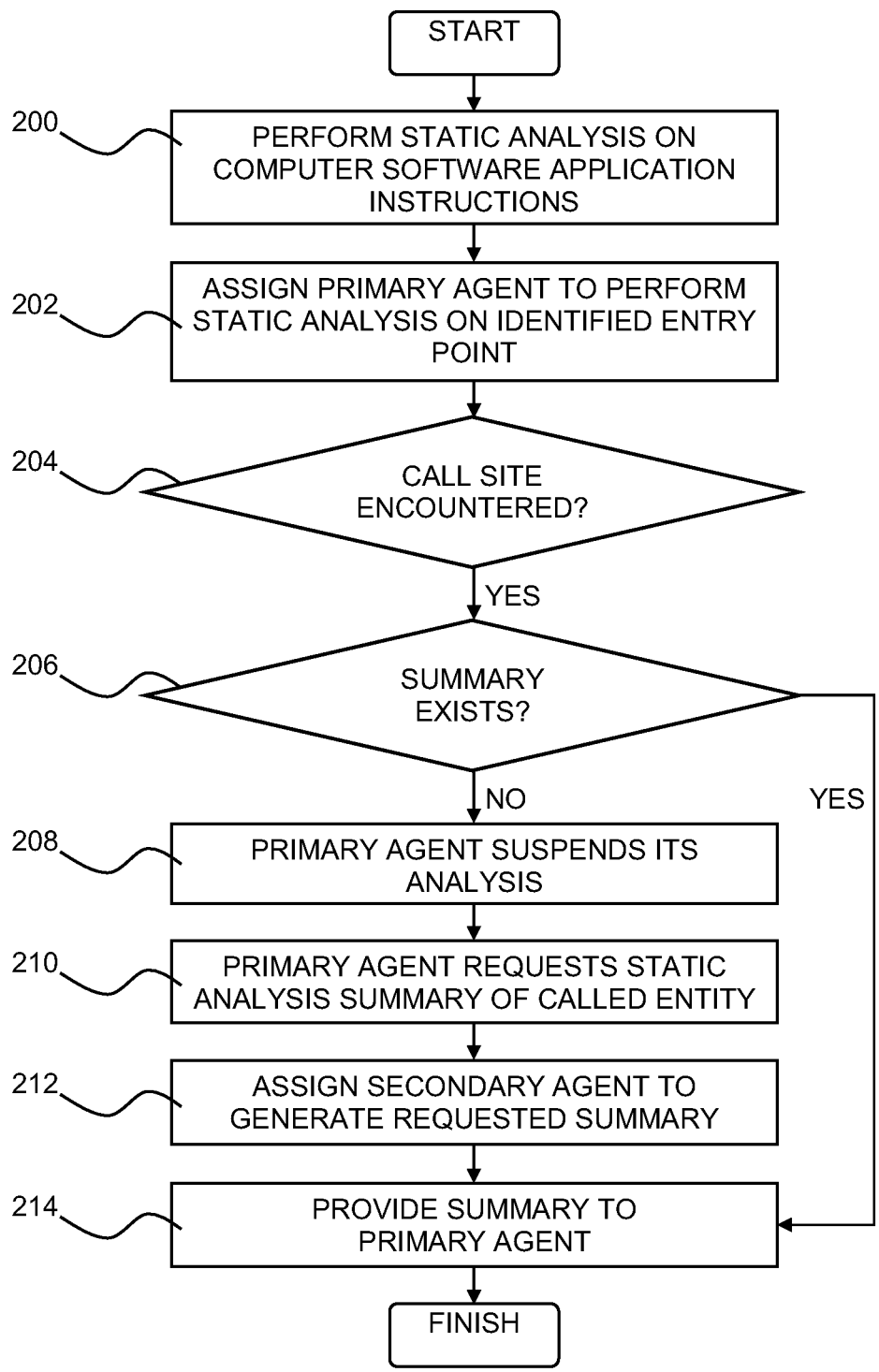
FIG. 2 is a flowchart illustration of an exemplary method of operation of the system of FIG. 1 in accordance with an embodiment of the present invention.

Reference is now made to FIG. 2 which is a flowchart illustration of an exemplary method of operation of the system of FIG. 1 in accordance with an embodiment of the present invention. In the method of FIG. 2, static analysis is performed on the instructions of a computer software application in accordance with conventional techniques, such as where the instructions are in the form of source code or byte code (200). For each entry point in the computer software application identified during the static analysis, a primary agent is assigned to begin statically analyzing the computer software application from the entry point and with respect thereto (202). When a primary agent encounters a call site (204), such as a reference to a method, procedure, or function that is external to the current method/procedure/function being analyzed, the primary agent checks whether a static analysis summary of the external method/procedure/function exists (206). If the summary exists, such as where the summary was previously requested, generated, and retained, the summary is provided to the primary agent which proceeds with its analysis using the summary (214). If the summary does not exist, the primary agent preferably suspends its analysis (208) and issues a request for a static analysis summary of the external method/procedure/function (210), such as by placing the request on a designated queue of requests for static analysis summaries. When making the request, the primary agent preferably specifies one or more arguments based on the characteristics of the call site. A secondary agent is assigned to statically analyze the called external method/procedure/function as per the request, and produce an analysis summary thereof in accordance with conventional techniques (212). The summary is provided to the requesting primary agent which proceeds with its analysis using the summary (214). The results of the static analysis performed using the method of FIG. 2 may be presented to a user in accordance with conventional techniques via a computer-controlled output device such as a printer or computer monitor.

The system of FIG. 1 and method of FIG. 2, and particularly the interaction between primary and secondary agents, may be illustrated in the context of exemplary Java™ source code as shown in FIG. 3, where the type of static analysis being performed is taint analysis, where untrusted values are tracked to determine whether they flow into security-sensitive program points. In the example shown in FIG. 3, the values read from the 'args' array are untrusted, and the creation of a new file on the file system, accomplished by the call to 'new File( . . . )', is a security-sensitive operation. In accordance with the present invention, a primary agent is assigned to track 'args'. The primary agent encounters the flow 'args[0]--->fileName', and then determines that 'fileName' flows into the first (and only) formal argument of 'tempDirPrefix( . . . )'. At this point, the primary agent checks whether a summary exists of the flow across the site. If no summary is available, the primary agent suspends its analysis and submits a request for 'tempDirPrefix( . . . )' to be summarized assuming its first formal argument is tainted. A secondary agent is then assigned to generate the summary, resulting in the flow 'arg--->return', where 'return' denotes the return value from the call. The primary agent continues its analysis using the summary, proceeds to track 'tempFilePath', and observes that the latter variable flows into the 'File' constructor, at which point a vulnerability is flagged.

Figure 4:
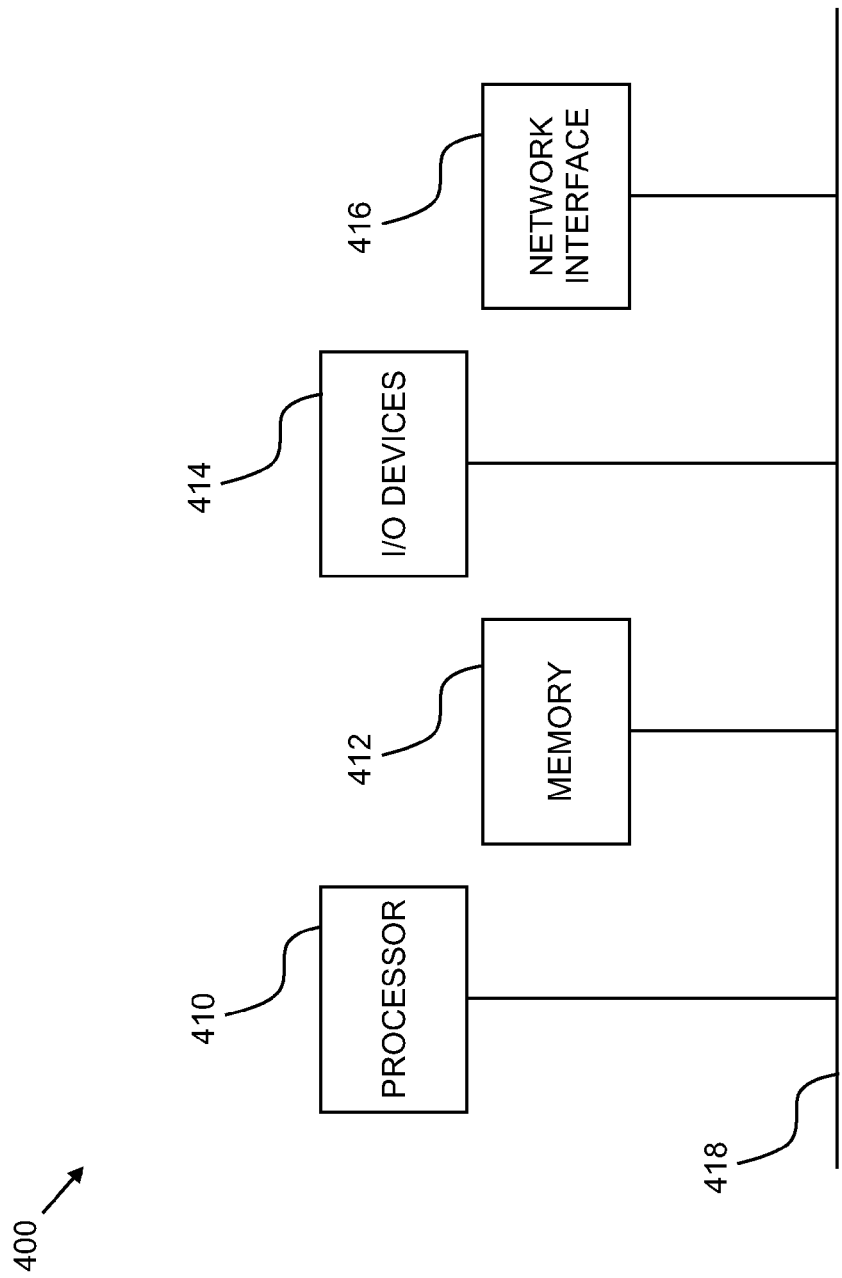
FIG. 4 is a block diagram illustration of an exemplary hardware implementation of a computing system in accordance with an embodiment of the present invention.

Referring now to FIG. 4, block diagram 400 illustrates an exemplary hardware implementation of a computing system in accordance with which one or more components/methodologies of the present invention (e.g., components/methodologies described in the context of FIGS. 1-3) may be implemented, according to an embodiment of the present invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the present invention as a whole and is not to be construed as limiting the present invention to the embodiments shown. It is appreciated that various modifications may occur to those skilled in the art that, while not specifically shown herein, are nevertheless within the true spirit and scope of the present invention.

What is claimed is:

1. A computer program product for distributed static analysis of computer software applications, the computer program product comprising:
   a computer-readable storage medium not including signals per se; and
   computer-readable program code embodied in the computer-readable storage medium, wherein the computer-readable program code is configured to:
      statically analyze instructions of a computer software application,
      identify at least one entry point in the computer software application,
      assign, by a primary agent manager, a primary agent to statically analyze the computer software application from the entry point,
      assign, by a secondary agent manager, a secondary agent to statically analyze a call site encountered by the primary agent and produce a static analysis summary of the call site, wherein the call site comprises an external reference, and wherein the secondary agent is tasked with analyzing the external reference to produce the static analysis summary of the call site, wherein analysis of the external reference by the secondary agent is triggered by the static analysis performed by the primary agent when
         i) the primary agent encounters the call site requiring static analysis,
         ii) the primary agent issues a request to a summaries data store for the static analysis summary of the call site and the static analysis summary of the call site does not exist in the summaries data store, and
         iii) the primary agent places a request for the static analysis summary of the call site on a queue of requests for static analysis summaries,
      resume the primary agent's static analysis of the computer software application using the static analysis summary of the call site after the static analysis summary of the call site is produced,
      present results of any of the static analyses via a computer-controlled output device, and wherein the assigning the primary agent and the assigning the secondary agent produce static analysis that is scalable and precise for the computer software application.

2. The computer program product of claim 1, wherein the computer-readable program code configured to assign the primary agent to statically analyze the computer software application form the entry point is further configured to:
   check whether the static analysis summary of the call site exists in the summaries data store;
   statically analyze the computer software application from the entry point using the static analysis summary of the call site if the static analysis summary of the call site exists; and
   if the static analysis summary of the call site does not exist,
      suspend the primary agent's static analysis of the computer software application,
      issue the request for the static analysis summary of the call site, and
      store the static analysis summary of the call site in the summaries data store.

3. The computer program product of claim 1, wherein the primary agent is a computer process that is executed by either a single computer processor or a single core of a multi-core computer processor.

4. The computer program product of claim 1, wherein the computer-readable program code configured to assign the primary agent to statically analyze the computer software application from the entry point is further configured to:
   assign a plurality of primary agents to statically analyze the computer software application from a plurality of entry points of the computer software application,
   wherein each of the plurality of primary agents statically analyzes a different one of the plurality of entry points, and
   wherein the plurality of primary agents operate concurrently.

5. The computer program product of claim 1, wherein the computer-readable program code configured to assign the primary agent to statically analyze the computer software application from the entry point is further configured to:
   assign the primary agent from a pool and returning the primary agent to the pool once the primary agent completes the primary agent's static analysis of the primary agent's assigned entry point.

6. The computer program product of claim 1, wherein the secondary agent is a computer process that is executed by either a single computer processor or a single core of a multi-core computer processor.

7. The computer program product of claim 1, wherein the computer-readable program code configured to assign the secondary agent to statically analyze the call site encountered by the primary agent and produce the static analysis summary of the call site is further configured to:
   assign a plurality of secondary agents to statically analyze a plurality of call sites and produce a corresponding plurality of static analysis summaries,
   wherein each of the plurality of secondary agents statically analyzes a different one of the plurality of call sites, and
   wherein the plurality of secondary agents operate concurrently.

8. The computer program product of claim 1, wherein the computer-readable program code configured to assign the secondary agent to statically analyze the call site encountered by the primary agent and produce the static analysis summary of the call site is further configured to:
   assign the secondary agent from a pool and returning the secondary agent to the pool once the secondary agent completes the secondary agent's static analysis of the secondary agent's assigned call site.

9. The computer program product of claim 1, wherein the computer-readable program code configured to assign the primary agent to statically analyze the computer software application from the entry point is further configured to assign a plurality of primary agents to statically analyze the computer software application from a plurality of entry points of the computer software application,
   wherein the computer-readable program code configured to assign the secondary agent to statically analyze the call site encountered by the primary agent and produce the static analysis summary of the call site is further configured to assign a plurality of secondary agents to statically analyze a plurality of call sites and produce a corresponding plurality of static analysis summaries, wherein each of the plurality of primary agents statically analyzes a different one of the plurality of entry points, wherein each of the plurality of secondary agents statically analyzes a different one of the plurality of call sites, and wherein the plurality of primary agents and secondary agents operate concurrently.

10. The computer program product of claim 2 wherein when the computer-readable program code is configured to assign a primary agent to statically analyze the computer software application, the computer-readable program code is further configured to:

specify an abstraction for each argument required by the call site, wherein the abstraction is specified by the primary agent when the primary agent:

i) checks whether the static analysis summary of the call site exists, and ii) issues the request for the static analysis summary of the call site, and produce the static analysis summary of the call site with respect to the each specified abstraction.

11. A system for distributed static analysis of computer software applications, the system comprising:

one or more processors; and a computer-readable storage medium comprising computer-readable program code embodied in the computer-readable storage medium, wherein the computer-readable program code is configured to:

statically analyze instructions of a computer software application;

identify at least one entry point in the computer software application;

assign, by a primary agent manager, a primary agent to statically analyze the computer software application from the entry point;

assign, by a secondary agent manager, a secondary agent to statically analyze a call site encountered by the primary agent and produce a static analysis summary of the call site, wherein the call site comprises an external reference, and wherein the secondary agent is tasked with analyzing the external reference to produce the static analysis summary of the call site, wherein analysis of the external reference by the secondary agent is triggered by the static analysis performed by the primary agent when i) the primary agent encounters the call site requiring static analysis, ii) the primary agent issues a request to a summaries data store for the static analysis summary of the call site and the static analysis summary of the call site does not exist in the summaries data store, and iii) the primary agent places a request for the static analysis summary of the call site on a queue of requests for static analysis summaries, resume the primary agent's static analysis of the computer software application using the static analysis summary of the call site after the static analysis summary of the call site is produced;

present results of any of the static analyses via a computer-controlled output device, and wherein the assigning the primary agent and the assigning the secondary agent produce static analysis that is scalable and precise for the computer software application.

12. The system of claim 11, wherein the computer-readable program code configured to assign a primary agent to statically analyze the computer software application from the entry point is further configured to:

check whether the static analysis summary exists of the call site in the summaries data store;

statically analyze the computer software application from the entry point using the static analysis summary of the call site if the static analysis summary of the call site exists; and if the static analysis summary of the call site does not exist,
suspend the primary agent's static analysis of the computer software application,
issue the request for a static analysis summary of the call site, and
store the static analysis summaries of the call site in the summaries data store.

13. The system of claim 11, wherein the entry point is an interaction interface exposed by the computer software application to a source of interaction that is external to the computer software application.

14. The system of claim 11, wherein the computer-readable program code configured to assign the primary agent to statically analyze the computer software application from the entry point is further configured to:

assign a plurality of primary agents to statically analyze the computer software application from a plurality of entry points of the computer software application, wherein each of the plurality of primary agents statically analyzes a different one of the plurality of entry points, wherein the plurality of primary agents operate concurrently, and wherein each of the primary agents are executed by a different computer processor or computer processor core.

15. The system of claim 11, wherein the call site is a reference to any of a method, a procedure, and a function that is external to a method, procedure, or function where the call site is found within the computer software application.

16. The system of claim 11, wherein the computer-readable program code configured to assign the secondary agent to statically analyze the call site encountered by the primary agent and produce the static analysis summary of the call site assign is further configured to:

assign a plurality of secondary agents to statically analyze a plurality of call sites and produce a corresponding plurality of static analysis summaries, wherein each of the plurality of secondary agents statically analyzes a different one of the plurality of call sites, wherein the plurality of secondary agents operate concurrently, and wherein each of the secondary agents are executed by a different computer processor or computer processor core.

17. The system of claim 11, wherein the computer-readable program code configured to assign the primary agent to statically analyze the computer software application from the entry point is further configured to assign a plurality of primary agents to statically analyze the computer software application from a plurality of entry points of the computer software application, wherein the computer-readable program code configured to assign the secondary agent to statically analyze the call site encountered by the primary agent and produce the static analysis summary of the call site assign is further configured to assign a plurality of secondary agents to statically analyze a plurality of call sites and produce a corresponding plurality of static analysis summaries, wherein each of the plurality of primary agents statically analyzes a different one of the plurality of entry points, wherein each of the plurality of secondary agents statically analyzes a different one of the plurality of call sites, wherein the plurality of primary agents and secondary agents operate concurrently, and wherein each of the primary agents and secondary agents are executed by a different computer processor or computer processor core.

* * * * *